United States Patent
Hashizume

(10) Patent No.: US 7,304,772 B2
(45) Date of Patent: Dec. 4, 2007

(54) IMAGE-READING APPARATUS

(75) Inventor: Yusuke Hashizume, Urayasu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1058 days.

(21) Appl. No.: 10/383,679

(22) Filed: Mar. 10, 2003

(65) Prior Publication Data

US 2003/0184814 A1    Oct. 2, 2003

(30) Foreign Application Priority Data

Mar. 27, 2002    (JP)    ............... 2002-089846

(51) Int. Cl.
   H04N 1/04    (2006.01)
(52) U.S. Cl. .............. 358/474; 358/488; 358/471
(58) Field of Classification Search ............... 358/488, 358/449, 451, 468, 474, 497, 494, 471; 250/234–236; 382/312, 318, 319
   See application file for complete search history.

(56) References Cited

FOREIGN PATENT DOCUMENTS

| JP | 8-32763 A | 2/1996 |
|---|---|---|
| JP | 08-083033 A | 3/1996 |
| JP | 10-123878 A | 5/1998 |
| JP | 2000-188650 A | 7/2000 |
| JP | 2001075685 A * | 3/2001 |
| JP | 2001-217964 A | 8/2001 |
| JP | 2006148693 A * | 6/2006 |
| JP | 2006259160 A * | 9/2006 |

* cited by examiner

*Primary Examiner*—Cheukfan Lee
(74) *Attorney, Agent, or Firm*—Foley & Lardner LLP

(57) ABSTRACT

In an image-reading apparatus, the size of a document placed at a predetermined position is sensed by a document size sensor, an image is read from the document in the document size sensed, and image data indicative of the read image is subjected to certain processing executed by an image processing section. A power supply section is provided which includes a first power supply which supplies power to the image processing section, and a second power supply which supplies power to the document size sensor. The second power supply is supplied with power from the first power supply and can be turned on and off independently of turn-on and turn-off of the first power supply. A power supply control section is also provided which controls turn-on and turn-off of the second power supply.

4 Claims, 3 Drawing Sheets

IMAGE-READING APPARATUS

CROSS-REFERENCE TO RELATED APPLICATIONS

This application is based upon and claims the benefit of priority from the prior Japanese Patent Application No. 2002-089846, filed Mar. 27, 2002, the entire contents of which are incorporated herein by reference.

BACKGROUND OF THE INVENTION

1. Field of the Invention

The present invention relates to an image-reading apparatus that detects the size of a document placed in a prescribed position and reads an image from the document, in the document size detected.

2. Description of the Related Art

Image-reading apparatuses for use in copying apparatus or scanners have been developed. Most of them have the function of automatically detecting the size of a document placed at a prescribed position.

An image-reading apparatus of this type has a plurality of reflection-type photosensors each including a light-applying element and light-receiving element. These photosensors are arranged at specified positions below the document table on which a document is mounted. The light-applying elements are connected to a pulse-wave oscillator circuit that generates pulses at prescribed intervals. Hereinafter, the combination of the reflection-type photosensors and the pulse-wave oscillator circuit, both used to detect the size of a document, will be referred to as "document-size detecting sensor." The document-size detecting sensor is connected to a CPU that controls the reading of images. The CPU determines whether the reflection-type photosensors have detected a document or not. From the outputs of the photosensors the CPU detects the size of a document, if any.

Generally, the image-reading apparatus receives electrical power from a 3.3V or 5V power supply designed to drive control logic ICs or a 24V power supply designed to drive electrical motors and exposure lamps. The apparatus may need to operate on not only this power supply, but also another power supply. In this case, a regulator or the like is connected to the power supply to provide, if necessary, the other power supply, in order to avoid an increase in the power-supply cost. Hence, only the power-supply voltage specified above is applied from a switching power supply. This is why the control logic ICs incorporated in the image-reading apparatus operate on the same power supply. Since the document-size detecting sensor receives power from the switching power supply, it is turned on or off in accordance with the supply of power to or the interruption of the supply of power to the image-reading apparatus. More specifically, power is supplied to the document-size detecting sensor as long as the power supply of the image-reading apparatus remains on.

In the document-size detecting sensor, the pulse-wave oscillator circuit controls the light-applying elements. Ripples may therefore occur in the power supply of the light-applying elements. The power supply works also as power supply to the control logic ICs provided in the image-reading apparatus. If ripples occur in the power supply, they greatly influence the other control units connected to this power supply, such as the amplifier (AMP) unit, A/D unit, shading-correcting unit and image-processing unit. Of these units, the amplifier unit is most influenced. This is because this unit amplifies the analog signal output from the CCD incorporated in the image-reading apparatus. Ripples, if any in the power supplied to the amplifier unit, are superimposed on the image signal, which will represent an image that contains moiré.

BRIEF SUMMARY OF THE INVENTION

An object of the present invention is to provide an image-reading apparatus that detects the size of a document placed in a prescribed position and reads an image from the document, in the document size detected, without degrading the quality of the image.

According to an aspect of the invention there is provided an image-reading apparatus comprising: a document size sensor configured to sense a size of a document placed at a predetermined position; an image-reading section configured to read an image of the document in the size sensed by the document size sensor; a processing section configured to perform predetermined processing on image data corresponding to the image of the document read by the image-reading section; a power supply section including a first power supply which supplies power to the image processing section, and a second power supply which supplies power to the document size sensor, the second power supply being supplied with power from the first power supply and being able to be turned on and off independently of turn-on and turn-off of the first power supply; and a power supply control section configured to control turn-on and turn-off of the second power supply.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

An embodiment of the invention, in which an image-reading apparatus is used in a copying machine, will be described with reference to the accompanying drawings.

Figure 1:
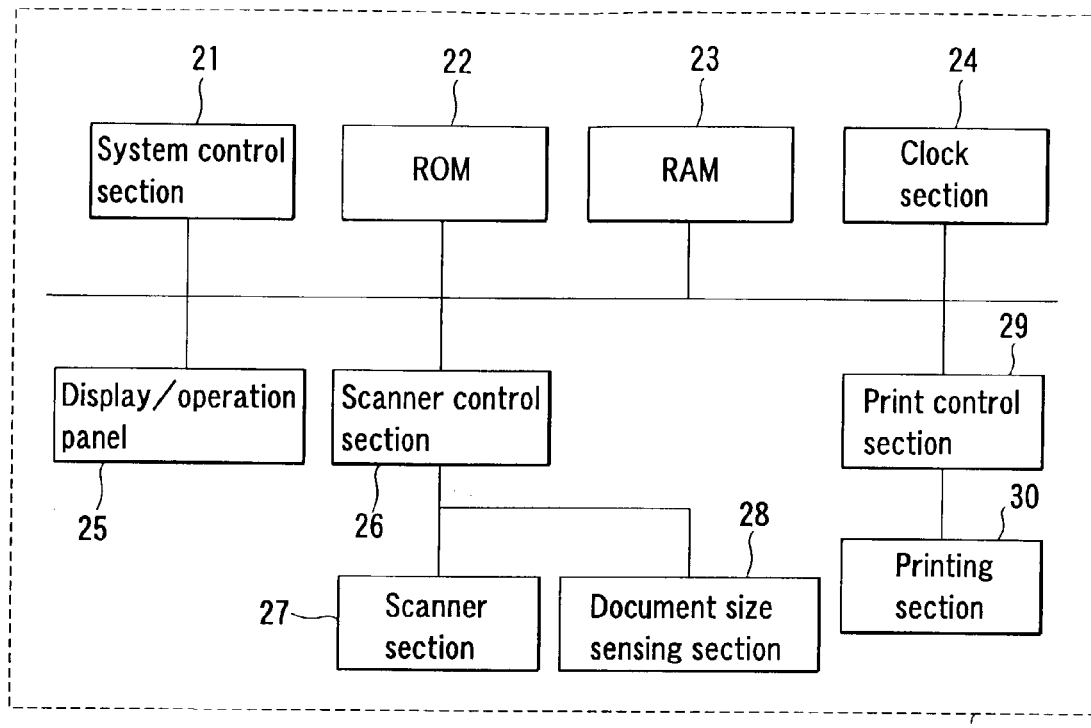
FIG. 1 is a block diagram illustrating an essential part of a copying machine according to an embodiment of the invention.

FIG. 1 is a block diagram illustrating an essential part of a copying machine 20. The copying machine 20 essentially comprises a system control section 21, ROM 22, RAM 23, clock section 24, display/operation panel 25, scanner control section 26, scanner section 27, document size sensing section 28, print control section 29 and printing section 30.

The system control section 21, ROM 22, RAM 23, clock section 24, display/operation panel 25, scanner control section 26, and print control section 29 are connected via a bus line. Further, the scanner control section 26 is connected to the scanner section 27 and document size sensing section 28, and the print control section 29 is connected to the printing section 30 via a bus line.

The system control section 21 controls each element of the copy machine 20 on the basis of the control programs stored in the ROM 22, thereby realizing the functions of the copy machine 20.

The ROM 22 stores, for example, the control programs for use in the system control section 21.

The RAM 23 is used as, for example, a work area that stores various information items necessary for the system control section 21 to execute various processes.

The clock section 24 executes time measurement all the time.

The display/operation panel 25 has a key input section for permitting a user to input various instructions for the system control section 21, e.g. to operate a start key 32 to start copying, and also has a display section formed of, for example, a liquid crystal display 33 for displaying various information items, to be informed of to the user, under the control of the system control section 21.

The document size sensing section 28 senses the size of a document placed on a document table (not shown) at a preset reference position.

The scanner control section 26 controls the scanner section 27 as an image reading section to read an image of a document that is placed on the document table and has its size sensed by the document size sensing section 28, thereby generating image data corresponding to the document.

The printing section 30 prints out the image data, generated by the scanner control section 26, onto a paper sheet fed through a paper path (not shown).

In the copy machine 20 constructed as the above, the control programs stored in the ROM 22 for the system control section 21 are general ones for use in copy machines. The copy machine 20 is shifted to a power save mode when the clock section 24 has measured a predetermined period after the machine 20 assumes a standby mode.

Figure 2:
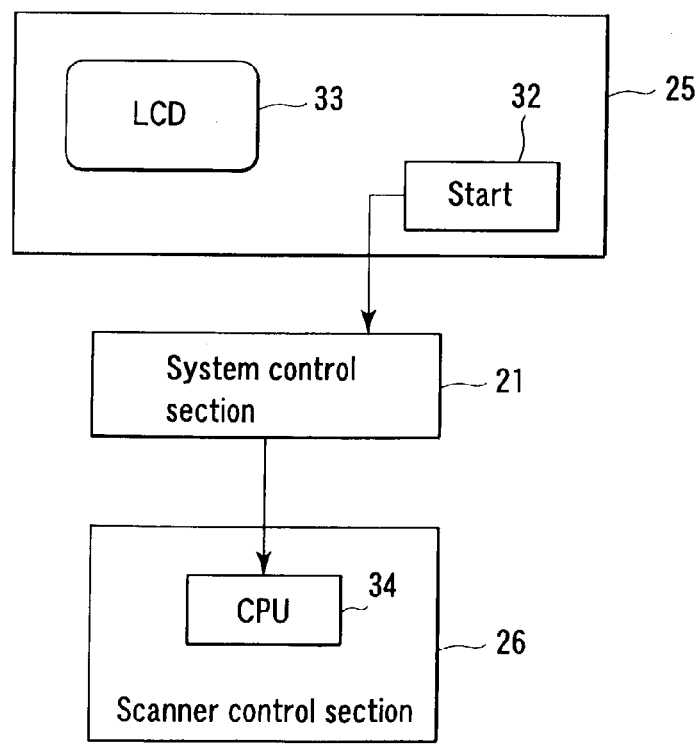
FIG. 2 is a block diagram useful in explaining the flow of a command.

FIG. 2 is a schematic view useful in explaining the transmission of a command performed by the system control section 21 upon receiving an instruction from a user.

For example, when the user has operated the start key 32 provided on the display/operation panel 25, the system control section 21 detects the operation of the start key 32, and transmits a read initiation command for initiating image reading, to a CPU 34 that controls the power supplied to the scanner control section 26 and document sensing section 28. Upon receiving the read initiation command, the CPU 34 controls the scanner control section 26 to start reading of an image. Thus, in the copy machine 20, the system control section 21 generates a command corresponding to an instruction input by a user through the display/operation panel 25, and transmits the command to each section.

Figure 3:
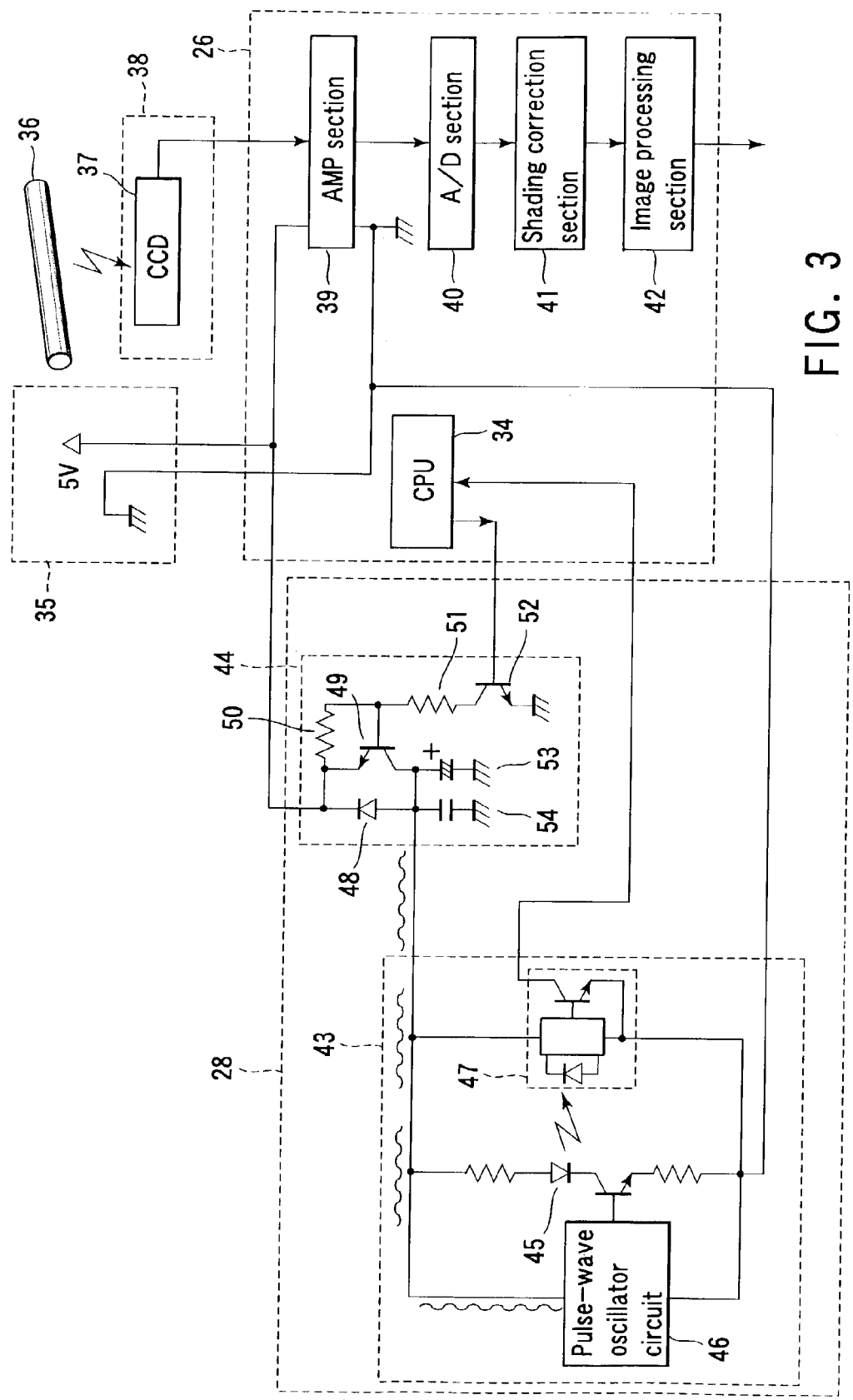
FIG. 3 is a view illustrating a scanner section, scanner control section and document size sensing section.

FIG. 3 shows the structures of the scanner control section 26, scanner section 27 and document size sensing section 28 (image reading apparatus).

The scanner section 27 comprises an exposure lamp 36 supplied with power from a power supply of 24V (not shown) for exposing a document to light; and a CCD plate 38 provided with a CCD 37 for receiving the light reflected from the document exposed by the exposure lamp 36, and outputting an analog electrical signal corresponding to the reflected light.

A voltage of 5V is applied from a power supply 35 to the scanner control section 26 and document size sensing section 28.

The scanner control section 26 comprises the above-described CPU 34, and an AMP section 39, A/D (analog/digital conversion) section 40, shading correction section 41 and image processing section 42. The CPU 34 controls the power supplied to the scanner control section 26 and document sensing section 28. The AMP section 39 is a signal amplification circuit for amplifying the analog electrical signal output from the CCD plate 38. The A/D conversion section 40 converts the analog electrical signal amplified by the AMP section 39 to digital electrical signal. The shading correction section 41 executes black shading and white shading for correcting variations in brightness between the pixels of the CCD 37. The image processing section 42 performs predetermined image processing on the data supplied from the shading correction section 41. The AMP section 39, shading correction section 41 and image processing section 42 form respective processing sections.

The document size sensing section 28 comprises a document size sensor 43, and a document size sensor power supply 44 formed of a switching circuit for supplying power to the document size sensor 43.

The document size sensor 43 comprises a plurality of reflective photosensors (not shown) each formed of a light-applying element 45 and light-receiving element. The photosensors are located below the document table at positions at which they can sense the size of each document placed on a predetermined reference portion of the document table. The light-applying element 45 is connected to a pulse-wave oscillator circuit 46. Each time the pulse-wave oscillator circuit 46 generates a pulse, the light-applying element 45 applies, for example, infrared rays. A light-receiving section 47, which is formed of the light-receiving elements, is connected to the CPU 34. The CPU 34 has inlet ports corresponding to the respective light-receiving elements. Each light-receiving element of the light-receiving section outputs, to a corresponding one of the inlet ports of the CPU 34, an electrical signal indicative of the amount of light received. When the CPU 34 has detected that a platen cover or auto document feeder, not shown, is closed, it determines, from the electrical signal received through each input port, whether or not a corresponding reflective photosensor detects a document, thereby detecting its size.

The document size sensor power supply 44 is formed of a circuit that comprises a diode 48, PNP transistor 49, resistors 50 and 51, NPN transistor 52 and capacitors 53 and 54.

A voltage of 5V is applied from the power supply 35 to the cathode side of the diode 48, the emitter of the PNP transistor 49 and the resistor 50. The base of the PNP transistor 49 is connected to the other end of the resistor 50, and also to the resistor 51. The other end of the resistor 51 is connected to the collector of the NPN transistor 52. The base of the NPN transistor 52 is connected to the CPU 34, and the emitter thereof is grounded.

Further, the collector of the PNP transistor 49 is connected to the capacitors 53 and 54, the anode side of the diode 48 and the document size sensor 43.

In the circuit constructed as the above, when the base current of the NPN transistor 52 flows in response to a control command from the CPU 34, the collector current of the NPN transistor 52 flows, and further the base current and collector current of the PNP transistor 49 flow. In accordance with the flow of the collector current of the PNP transistor 49, the capacitor 53 is charged. When the capacitor 53 is charged and serves as a power supply, the power supply of the document size sensor 43 is changed from the 5V power supply 35 to the capacitor 53. In other words, power is supplied to the document size sensor 43 from the capacitor 53, not from the power supply 35 that supplies power to the AMP section 39, A/D section 40, shading correction section 41 and image processing section 42 (power supply section).

Thus, the CPU 34 can control the ON/OFF of the document size sensor power supply 44 by controlling the flow of the base current of the NPN transistor 52. In other words, the CPU 34 can control the ON/OFF of the document size sensor power supply 44, independent of the ON/OFF state of the power supply 35 that supplies power to the AMP section 39, A/D section 40, shading correction section 41 and image processing section 42.

The operation of the copying machine 20 constructed as the above will be described. Since the operation of the machine 20 for realizing, for example, a printing function is the same as that of conventional copying machines, it is not explained. A detailed description will now be given of only the ON/OFF control of the document size sensor power supply 44 by the CPU 34.

Figure 4:
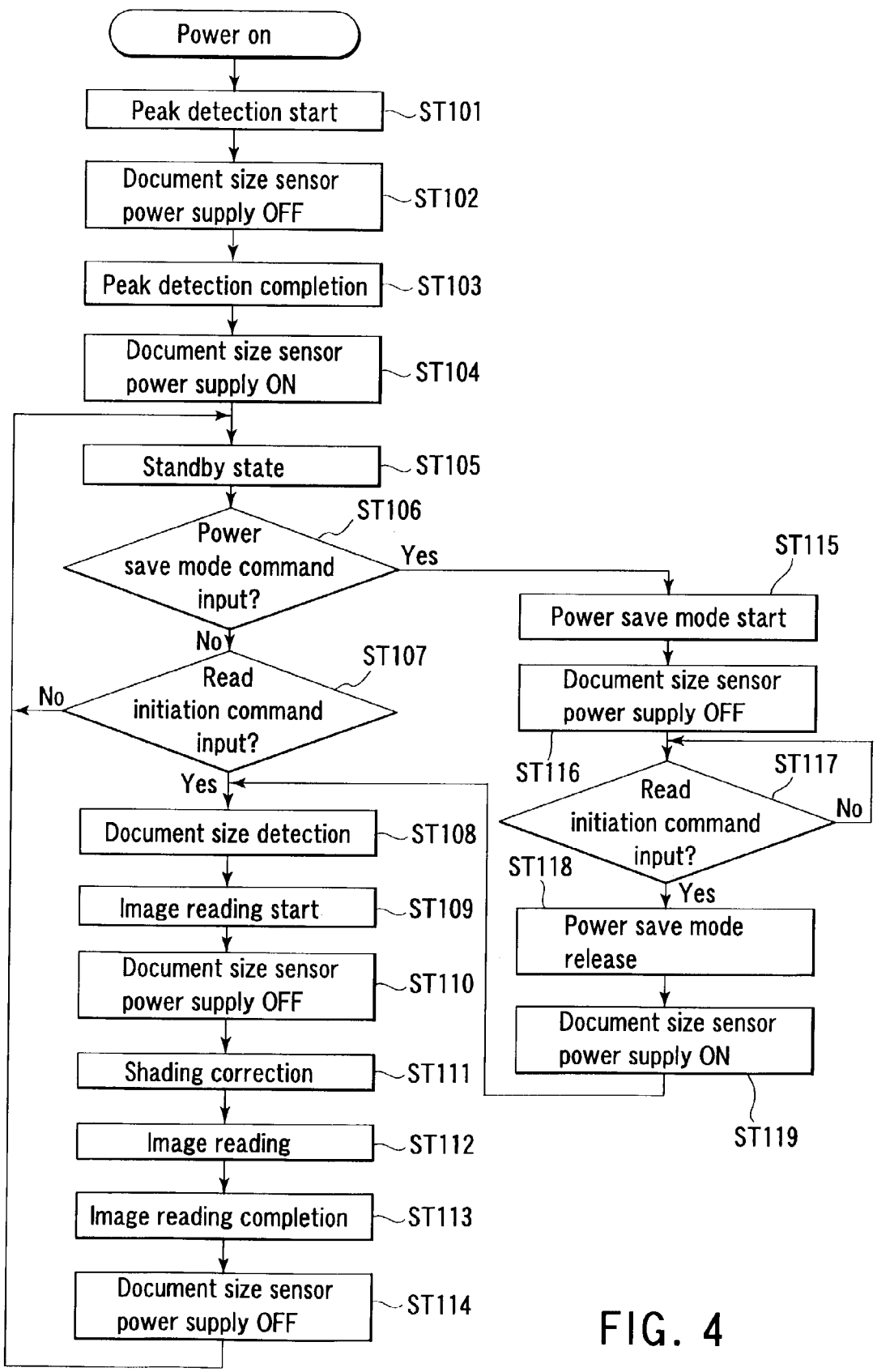
FIG. 4 is a flowchart useful in explaining the timing of the ON/OFF control of a document size sensor power supply.

FIG. 4 is a flowchart useful in explaining the ON/OFF control of the document size sensor 43 executed by the CPU 34 of the scanner control section 26 when a user has turned on the power supply (not shown) of the copying machine.

Upon the turn-on of the power supply, the CPU 34 starts to detect the peak of an analog electrical signal output from the CCD plate 38 for determining the gain of the AMP section 39 (step ST101). After initiating peak detection, the CPU 34 turns off the document size sensor power supply 44 (step ST102). After the completion of peak detection (step ST103), the CPU 34 turns on the document size sensor power supply 44 (step ST104).

Thus, the CPU 34 turns off the document size sensor power supply 44 during peak detection. The reason why the document size sensor power supply 44 can be turned off during peak detection is that during peak detection, initialization of the machine is usually being executed and therefore no document size detection is executed.

After finishing the above-descried peak detection, the CPU 34 assumes a standby state for image reading (step ST105). In the standby state, the CPU 34 determines whether or not a command for initiating a power save mode has been input from the system control section 21 (step ST106).

If the CPU 34 determines that no power save mode initiation command has been input, it further determines whether or not a read initiation command has been input from the system control section 21 (step ST107). If the CPU 34 determines that no read initiation command is input, it returns to the standby state at the step ST105. If the CPU 34 determines at the step ST107 that a read initiation command has been input, it detects the size of a document placed on the document table (step ST108).

After the document size detection, the CPU 34 starts image reading in the detected document size (step ST109). After image reading is started, the CPU 34 firstly turns off the document size sensor power supply 44 (step ST110). Subsequently, the shading correction section 41 is controlled to perform shading correction such as black shading, white shading (step ST111), and the image processing section 42 is controlled to perform image processing on the image read by the scanner section 27, thereby reading an image of the document (step ST112). When the CPU 34 has detected the completion of image reading (step ST113), it turns on the document size sensor power supply 44 (step ST114) and returns to the standby state of the step ST105.

As described above, the CPU 34 turns off the document size sensor power supply 44 when shading correction and image reading are executed. The reason why the document size sensor power supply 44 can be tuned off when shading correction and image reading are executed is that the document size is already determined before the image read initiation command is input.

On the other hand, in step ST106 if the CPU 34 determines that the power save mode initiation command has been input, it starts the power save mode (step ST115). After starting the power save mode, the CPU 34 firstly turns off the document size sensor power supply 44 (step ST116). The CPU 34 continues the standby state until the read initiation command is input from the system control section 21. When the read initiation command has been input (step ST117), the CPU 34 releases the power save mode (step ST118), and turns on the document size sensor power supply 44 (step ST119). After that, the CPU 34 proceeds to the step ST108, thereby repeating the above-described processing. Thus, the CPU 34 turns off the document size sensor power supply 44 in the power save mode.

In the above embodiment, the CPU 34 controls the document size sensor power supply 44 to supply power to the document size sensor 43, the power supply 44 differing from the 5V power supply 35 for supplying power to the scanner control section 26. Further, the CPU 34 turns off the document size sensor power supply 44 during peak detection, shading correction and image reading. This prevents the power supply 35 from being influenced by ripple if it is generated against the power supply by the pulse-wave oscillator circuit 46 incorporated in the document size sensor 43. Accordingly, the influence upon the image signal in the AMP section 39, A/D section 40 and image processing section 42 can be minimized to thereby prevent occurrence of moire images. As a result, the copying machine 20 is free from occurrence of defective images.

Further, in the prior art, since a single power supply is used for both the document size sensor and image reading apparatus, a current flows through the document size sensor even in the power save mode. Thus, even in the standby state of the power save mode, unnecessary power is consumed. On the other hand, the embodiment of the invention employs the document size sensor power supply 44 that can be turned on and off independently of the ON/OFF of the power supply 35 as the main power supply of the copying machine 20. Therefore, the CPU 34 can turn off the document size sensor power supply 44 in the power save mode, thereby suppressing the required standby power.

In the embodiment, the switching circuit using transistors is provided to enable the CPU 34 for scanner control to control the timing of power supply control. However, the switching circuit may be replaced with a circuit using FETs. Further, a physical switch member, whose switching is controlled by the CPU 34 for scanner control, may be provided between the document size sensor power supply 44 and document size sensor 43.

Furthermore, although in the embodiment, the CPU 34 of the scanner control section 26 controls the ON/OFF of the document size sensor power supply 44, the invention is not limited to this. For example, the system control section 21 may control the ON/OFF of the document size sensor power supply 44.

Additional advantages and modifications will readily occur to those skilled in the art. Therefore, the invention in its broader aspects is not limited to the specific details and representative embodiments shown and described herein. Accordingly, various modifications may be made without departing from the sprint or scope of the general inventive concept as defined by the appended claims and their equivalents.

What is claimed is:

1. An image-reading apparatus comprising:

a document size sensor configured to sense a size of a document placed at a predetermined position;

an image-reading section configured to read an image of the document in the size sensed by the document size sensor;

a processing section configured to perform predetermined processing on image data corresponding to the image of the document read by the image-reading section;

a power supply section including a first power supply which supplies power to the image processing section, and a second power supply which supplies power to the document size sensor, the second power supply being supplied with power from the first power supply and being able to be turned on and off independently of turn-on and turn-off of the first power supply; and a power supply control section configured to control turn-on and turn-off of the second power supply;

wherein the power supply control section turns off the second power supply in a power save mode assumed in a standby state to save power consumption.

2. The image-reading apparatus according to claim 1, wherein the power supply control section turns off the second power supply when the image-reading section reads the image of the document.

3. The image-reading apparatus according to claim 1, wherein the power supply control section turns off the second power supply during shading correction executed before the image-reading section reads the image of the document.

4. The image-reading apparatus according to claim 1, wherein the power supply control section turns off the second power supply when a peak of an analog signal output from a charge-coupled device is detected, the analog signal being output to determine a gain of a signal amplification circuit when the image-reading apparatus has been turned on.

* * * * *